United States Patent [19]

Yoshitsugu

[11] Patent Number: 4,681,346
[45] Date of Patent: Jul. 21, 1987

[54] AUTOMATICALLY FASTENING SEATBELT ASSEMBLY

[75] Inventor: Noritada Yoshitsugu, Aichi, Japan

[73] Assignee: Toyota Jidosha Kabushiki Kaisha, Japan

[21] Appl. No.: 804,081

[22] Filed: Dec. 3, 1985

[30] Foreign Application Priority Data

Dec. 12, 1984 [JP] Japan ............................ 59-188253[U]
Jan. 16, 1985 [JP] Japan ............................... 60-3860[U]

[51] Int. Cl.$^4$ ............................................. B60R 21/00
[52] U.S. Cl. ...................................... 280/804; 280/808
[58] Field of Search ......................... 280/804, 808, 802

[56] References Cited

U.S. PATENT DOCUMENTS

| 4,040,645 | 8/1977 | Giffen et al. | 280/745 |
| 4,191,400 | 3/1980 | Smith | 280/808 |
| 4,343,489 | 8/1982 | Suzuki et al. | 280/804 |
| 4,426,102 | 1/1984 | Katsuno | 280/804 |
| 4,466,666 | 8/1984 | Takada | 280/808 |
| 4,473,243 | 9/1984 | Ogawa | 280/808 |
| 4,560,187 | 12/1985 | Yoshitsugu | 280/804 |

FOREIGN PATENT DOCUMENTS

| 57-172851 | 10/1982 | Japan | 280/804 |
| 58-73260 | 5/1983 | Japan . | |

Primary Examiner—John J. Love
Assistant Examiner—Charles R. Watts
Attorney, Agent, or Firm—Parkhurst & Oliff

[57] ABSTRACT

An adjusting mechanism is provided for an automatically fastening seatbelt assembly which causes an occupant of a vehicle to be automatically held to a seat in the vehicle by restraining webbing after the occupant is positioned in the seat in the vehicle. The seatbelt assembly includes a guide rail, a slider which is displaceable along the guide rail and a restraining webbing which is fixed to the slider at one end thereof by an anchor plate. The adjusting mechanism allows adjustment of the position of an anchor plate in relation to the slider. The anchor plate is mounted pivotally to the slider by an anchor pin and a spring. The spring is located between the anchor plate and the slider and is fixed to either the anchor plate or the slider. Either the slider or the anchor plate (whichever the spring is not fixed to) has a plurality of adjusting holes. An engagement member on the spring selectively engages the plurality of adjusting holes. This engagement prevents pivotal movement of the anchor plate about the anchor pin, so that the anchor plate can be fixed at suitable positions to fit the restraining webbing to various size occupants. Furthermore, either the slider or the anchor plate includes block members which prevent the anchor plate from pivoting beyond the suitable positions for restraining occupants by the restraining webbing.

31 Claims, 14 Drawing Figures

AUTOMATICALLY FASTENING SEATBELT ASSEMBLY

BACKGROUND OF THE INVENTION

The present invention relates to an automatically fastening seatbelt assembly which causes an occupant of a vehicle to be automatically held to a seat in the vehicle by restraining webbing after the occupant is positioned in the seat in the vehicle. The seatbelt assembly includes a guide rail, a slider which is displaceable along the guide rail and restraining webbing which is fixed to the slider at one end thereof. The guide rail is provided with stop switches at both ends thereof, the stop switches being connected to a source of electricity or an electric control circuit through connecting wires. The stop switches detect the arrival of the slider at either end of the guide rail and generate signals indicating the same to the electric control circuit. More particularly, the present invention relates to improvements for adjusting the position of an anchor plate to fit the restraining webbing to the occupant by utilizing an adjusting means. The adjusting means overcomes fitting problems arising because a small occupant cannot otherwise properly be held to the seat by the restraining webbing.

A similar seatbelt assembly is disclosed in U.S. Pat. No. 4,343,489 (Suzuki et al.), which teaches a seatbelt system which includes a guide rail having a longitudinal guide groove therein. The guide rail is fixed on a roof side member of a vehicle, and a slider slides within the guide groove and is displaceable along the guide rail. The slider is connected to one end of a restraining webbing by an anchor plate.

Suzuki et al.'s anchor plate includes a recess and the slider includes a projection which projects in a lateral direction from an edge portion of the slider to engage with the recess of the anchor plate. Accordingly, the position of the anchor plate is fixed under normal use with respect to the slider in a position which will provide the greatest comfort to the average passenger. The projection also is designed so that, when the restraining webbing has a tensile force caused by abrupt movement of the vehicle, the projection can be broken away. As a result, the anchor plate can rotate about a bolt to position the restraining webbing at the angle which can best prevent the occupant from moving due to the abrupt movement of the vehicle.

However, as noted, the normal webbing position is chosen for the average passenger. The Suzuki et al. patent does not disclose any adjusting means which can fit the restraining webbing depending on the size of the occupants. It also has the disadvantage that the projection must be replaced after it breaks off.

Another seatbelt assembly is disclosed in U.S. Pat. No. 4,473,243 (Ogawa), which teaches a shoulder webbing anchoring device including a side anchor plate, a webbing anchor plate, an anchor pin and a holder plate. The side anchor plate is fixed on a window frame by bolts and the webbing anchor plate is mounted rotatably on the side anchor plate by the anchor pin. The holder plate includes a hemispherical projection and the webbing anchor plate includes a plurality of receiving holes. Accordingly, the holder plate prevents the webbing anchor plate from rotating about the anchor pin when the hemispherical projection of the holder plate is inserted into one of the plurality of receiving holes. When the hemispherical projection of the holder plate is inserted into another of the plurality of receiving holes, the webbing anchor plate is positioned in a different position about the anchor pin so that the restraining webbing can be adjusted to fit the restraining webbing to variously sized occupants.

However, the adjusting means disclosed in Ogawa patent cannot prevent the webbing anchor plate from rotating beyond the suitable positions for restraining the occupant by the restraining webbing. Further, the Ogawa adjusting means is fixed on the window frame of a door and is not movable along a guide rail. Accordingly, the Ogawa patent does not disclose a suitable structure for an adjusting means which is mounted on a slider.

SUMMARY OF THE INVENTION

The present invention was developed in view of the foregoing background and to overcome the foregoing drawbacks. It is accordingly an object of this invention to provide an adjusting means for adjusting the position of an anchor plate in relation to a slider which can be movable along a guide rail mounted on a body member of an automobile.

To achieve suitable fitting of a restraining webbing of an automatic fastening seatbelt to an occupant, the adjusting means includes a plurality of adjusting holes formed in either the slider or the anchor plate. The anchor plate is mounted pivotally on the slider by an anchor pin and a bias means having an engagement member. The bias means is located between the anchor plate and the slider, and is fixed to whichever of them does not have the adjusting holes so that its engagement member can engage the adjusting holes. Thus, if the adjusting holes are formed in the slider, the bias means is fixed to the anchor plate, while if the adjusting holes are formed in the anchor plate, the bias means is fixed to the slider. With this arrangement, when the engagement member of the bias means is engaged in one of the plurality of adjusting holes, rotation of the anchor plate about the anchor pin is prevented. The anchor plate then can be held at a suitable position to fit the restraining webbing to variously sized occupants simply by adjusting which hole is engaged by the engagement member.

Further, the bias means prevents the anchor plate from rotating about the anchor pin when there is no tension on the restraining webbing. Accordingly, the position of the anchor plate in relation to the slider is maintained when the restraining webbing is not in use, and an occupant need not adjust the position of the anchor plate in relation to the slider every time he gets in and out of the vehicle. Adjustment is required only when a different size person occupies the seat.

Furthermore, either the slider or the anchor plate can be provided with a block member (i.e., rotation preventing means) which prevents the anchor plate from rotating beyond the suitable positions for restraining an occupant by the restraining webbing.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate different embodiments according to the present invention.

Figure 1:
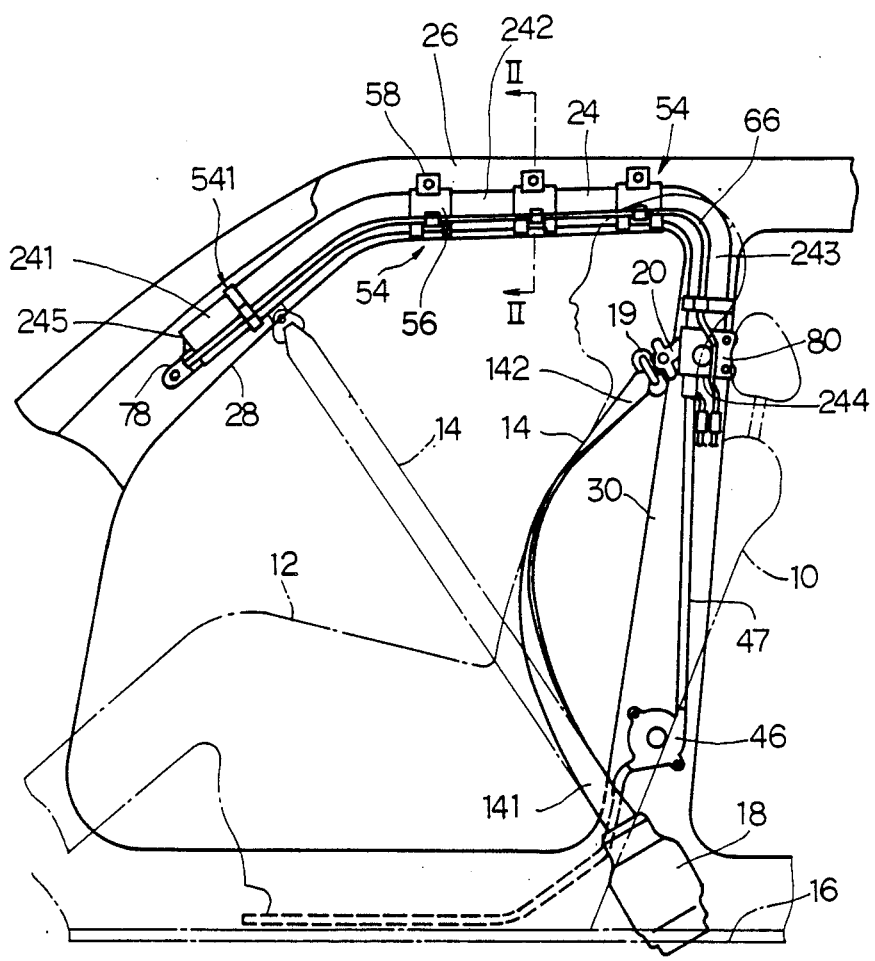
FIG. 1 is a side view of a seatbelt system according to the present invention installed on a right side of a vehicle, as viewed from the left side of the vehicle.

Referring to FIG. 1, a restraining webbing 14 is designed such that it extends and surrounds the body of an occupant 12 when the occupant 12 is positioned upon the seat 10. Further, when the vehicle door (not shown in drawings) is opened, the location of the restraining webbing 14 is represented by the broken line. A retractor 18 winds a portion 141 of the webbing 14 therein. The retractor 18 is secured to a floor member 16 of a vehicle. The retractor 18 is located at a substantially central portion in the lateral direction of the vehicle. The retractor 18 includes a locking mechanism which prevents an abrupt windoff of the webbing 14 in an emergency situation. Such mechanisms are well known and therefore will not be described further herein.

Figure 2:
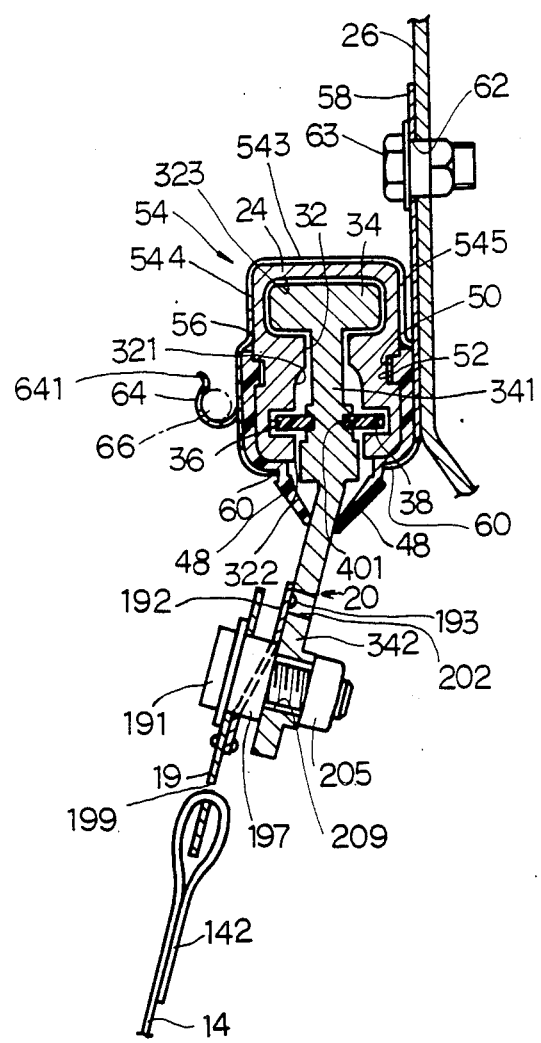
FIG. 2 is an enlarged cross-sectional view taken along the line II—II in FIG. 1, wherein a slider is disposed on the line II—II in FIG. 1.

As shown in FIG. 2, an outer portion 142 of the webbing 14 is connected to a slider 20 by an anchor plate 19. The slider 20 is located within a guide groove 32 defined within a guide rail 24. The guide groove 32 extends in the longitudinal direction along the guide rail 24, and the slider 20 is longitudinally displaceable along this guide groove 32.

The slider 20 includes a head portion 34 and a body portion 341, such that the slider 20 is substantially T-shaped in cross section. The body portion 341 includes a leg portion 342 at a lower end thereof. The anchor plate 19 is rotatably connected to a lower end of the leg portion 342 of the slider 20 by a nut 205, an anchor bolt 191 and a spring 192.

The head portion 34 of the slider 20 is slidably received in a head groove 323. The body portion 341 includes an installing recess 401, which receives a driving tape 38 for driving the slider 20. The driving tape 38 and the body portion 341 are displaceable along a guiding slit 322 which extends in the longitudinal direction of the guide rail 24. The driving tape 38 is displaceable within a tape groove 36, and the driving tape 38 perpendicularly intersects an intermediate portion 321 of the guide groove 32. The tape groove 36 also extends along the longitudinal direction of the guide rail 24. More specifically, the driving tape 38 is displaceable along the tape groove 36 such that the slider 20 can move between a forward portion 245 and a rearward portion 244 of the guide rail 24 (as shown in FIG. 1).

The guide rail 24 includes mounting grooves 52 which are longitudinally provided along the guide rail 24. The mounting grooves 52 can be continuously or intermittently formed in both side surfaces of the guide rail 24. Flexible lips 48 are provided to conceal the guiding slit 322 of the guide groove 32 and improve the aesthetic appearance of the assembly, with projections 50 of the lips 48 received and held within the mounting grooves 52.

Referring again to FIG. 1, the guide rail 24 is fixed to a front pillar 28, a roof side member 26 and a center pillar 30 of the vehicle. A slanted front portion 241 of the guide rail 24 is secured to the front pillar 28. A horizontal central portion 242 of the guide rail 24 is secured to the roof side member 26. A vertical rear portion 243 of the guide rail 24 is secured to the center pillar 30.

As shown in FIGS. 1 and 2, hangers 54 are provided to fix the guide rail 24 to the vehicle body. Each hanger 54 includes a holding portion 56, a mounting flange 58, and a clamp 64. The holding portion 56 holds or supports the guide rail 24 and has a top horizontal plate 543, an inner vertical plate 544 and an outer vertical plate 545. The inner vertical plate 544 extends downwardly from an inner edge of the top horizontal plate 543, while the outer vertical plate 545 extends downwardly from an outer edge of the top horizontal plate 543. The vertical plates 544 and 545 are spaced laterally apart. Further, two bent portions 60 extend horizontally toward each other from respective lower ends of the vertical plates 544 and 545. Each bent portion 60 hooks onto a lip 48 and the guide rail 24. The mounting flange 58 extends upwardly from the outer vertical plate 545. The mounting flange 58 is provided with a hole 62 for inserting a mounting bolt 63 therethrough.

The clamp 64 of each hanger 54 extends from the inner vertical plate 544 and includes a clamping tab 641. The clamp 64 is bent to resemble a "C" or a "U" shape opening upwardly. Thus, the hanger 54 is provided with a wire receiving recess opened upwardly, and defined between the inner vertical plate 544 and the clamping tab 641. The connecting wire 66 is inserted into the wire receiving recess from an upward position by downwardly inserting the connecting wire 66 therein. The wire receiving recess has an inlet disposed on an upper portion thereof, which is defined between the inner vertical plate 544 and an end of the clamping tab 641. A portion of the inlet is narrower than the diameter of the connecting wire 66 such that the connecting wire 66 is maintained within the clamp 64. When the hanger 54 is fixed to the roof side member 26 by the mounting bolt 63, the C-shaped clamp 64 projects inwardly toward the passenger compartment. Thus, the connecting wire 66 is fixed securely on an inner surface of the guide rail 24.

Figure 3:
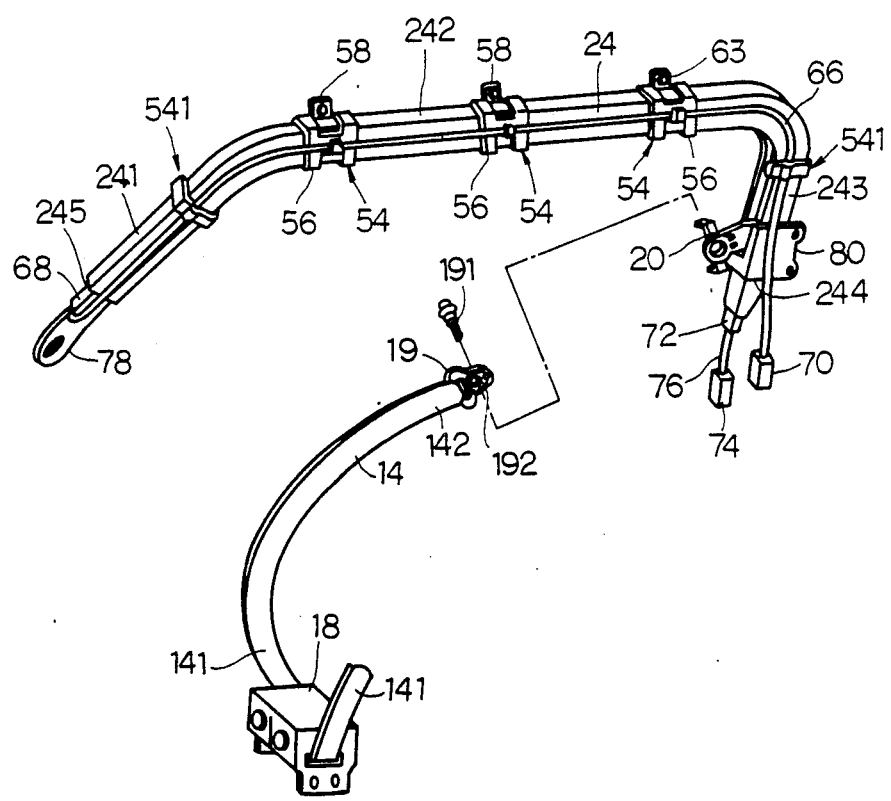
FIG. 3 is an enlarged perspective view of a guide rail according to the present invention which is ready to be installed in a vehicle.

As shown in FIG. 3, a forward stop switch 68 is located on the front end 245 of the guide rail 24, and a rearward stop switch 72 is located on the rear end 244 of the guide rail 24. The forward stop switch 68 and the rearward stop switch 72 are fixed to the guide rail 24 by anchor brackets 78 and 80, respectively. The forward stop switch 68 and the rearward stop switch 72 are provided with actuators (not shown in the drawings) which come into contact with the head portion 34 of the slider 20 when the slider 20 reaches the front end 245 or the rear end 244 of the guide rail 24. When the slider 20 contacts the actuator of either of the stop switches 68 or 70, the movement of the slider 20 and the driving tape 38 is terminated.

Further, the connecting wire 66 is connected at a first end thereof to the forward stop switch 68 and at a second end thereof to a first connector 70. The first connector 70 can be connected with a source of electricity. Another connecting wire 76 is similarly connected at a first end to the rearward stop switch 72 and at a second end to a second connector 74. The second connector 74 can also be connected with a source of electricity.

Figure 4:
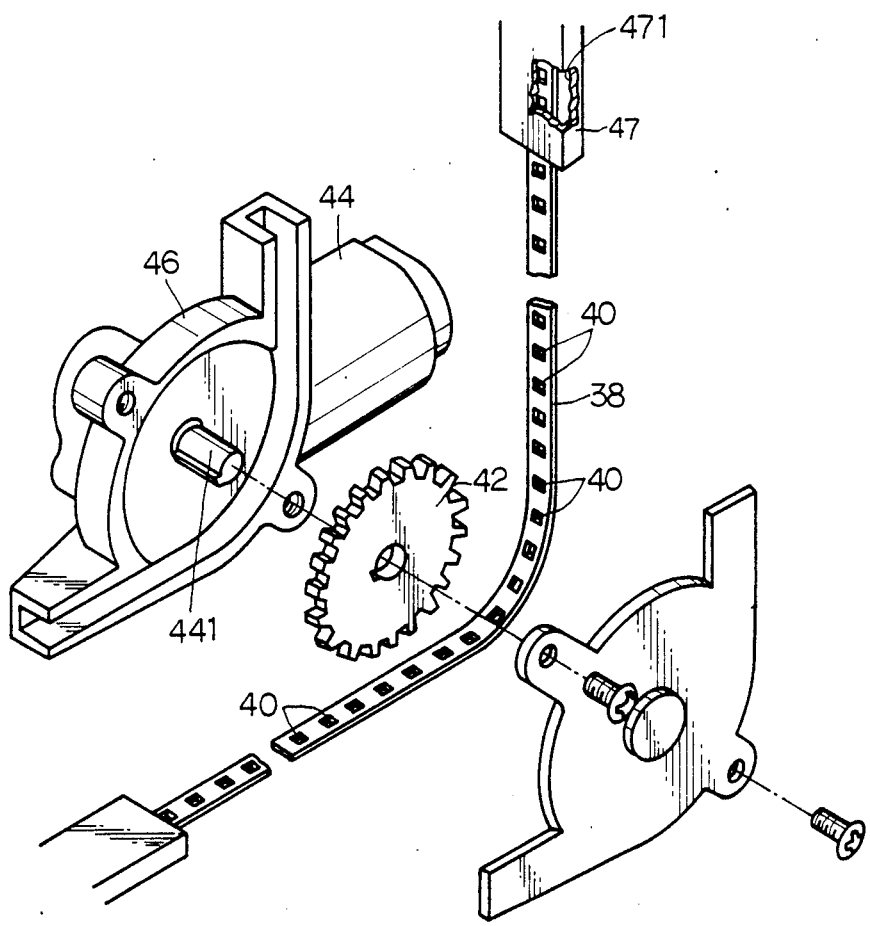
FIG. 4 is an enlarged perspective view showing components of a driving means (in a disassembled condition) for driving a tape which is connected to the slider at one end thereof.

Furthermore, as shown in FIG. 1, the rearward end 244 of the guide rail 24 is connected to a tape track 47, which includes a tape groove 471 therein (shown in FIG. 4). This tape groove 471 communicates with the tape groove 36 of the guide rail 24. A lower end of the tape track 47 is in contact with a sprocket housing 46, which is secured to a lower portion of the center pillar 30. As shown in FIG. 4, rectangular openings 40 of the driving tape 38 mesh with a sprocket wheel 42, which is supported rotatably in the sprocket housing 46. The sprocket wheel 42 is adapted to be rotated by an output shaft 441 of a motor 44, and when the sprocket wheel 42 rotates, the sprocket wheel 42 drives the driving tape 38 such that the driving tape 38 moves along the tape track 47 and the guide rail 24. The movement of the driving tape 38 in turn causes the slider 20 to move between the forward and rearward ends of the guide rail 24.

The motor 44 displaces the driving tape 38 whenever an occupant enters the vehicle or prepares to exit the vehicle. For example, when an occupant sits on the seat 10 of the vehicle and closes the door, the sprocket wheel 42 turns in a clockwise direction (with respect to FIG. 4), whereby the slider 20 is displaced from the forward end 245 of the guide rail 24 toward the rearward end 244. The slider 20 stops when it reaches the rearward stop switch 72. Conversely, when an occupant opens the door, the sprocket wheel 42 turns in a counter-clockwise direction, whereby the slider 20 is displaced from the rearward end 244 of the guide rail 24 toward the forward end 245. For a detailed discussion of how the automatic seatbelt assembly actually operates, see U.S. Pat. No. 4,343,489 (Suzuki et al.), which is incorporated herein by reference.

Figure 5:
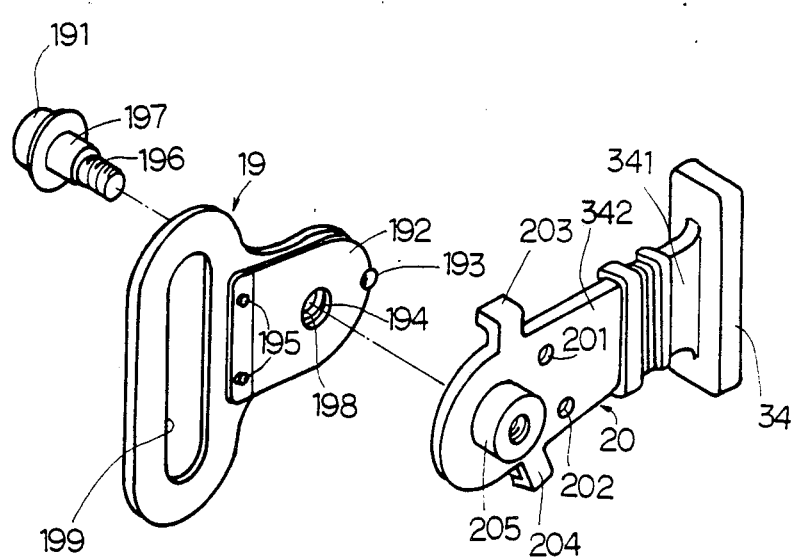
FIG. 5 is an enlarged perspective view showing an adjusting means (in a disassembled condition) for adjusting the position of an anchor plate in relation to a slider about an anchor bolt.

FIG. 5 shows, in a disassembled condition, an adjusting means for adjusting the position of the anchor plate 19 in relation to the slider 20 about the anchor bolt 191. The anchor plate 19 includes an aperture 198 and a slot 199. An the outer portion 142 of the webbing 14 is inserted into the slot 199 and connected to the anchor plate 19 (as shown in FIG. 2). An edge of the spring 192 is fixed to the anchor plate 19 by a plurality of pins 195 and another edge of the spring 192 is biased away from the anchor plate 19. A hemispherical projection 193 is formed on the other edge of the spring 192, and an opening 194 is formed in the spring 192.

The slider 20 includes a plurality of holes 201 and 202, an aperture 209 (shown in FIG. 2) and a pair of blocks 203 and 204 which are located in the leg portion 342 thereof.

The anchor bolt 191 includes a large diameter portion 197 and a smaller diameter threaded portion 196. The large diameter portion 197 of the anchor bolt 191 is inserted into the aperture 198 of the anchor plate 19 and the opening 194 of the spring 192. The threaded portion 196 of the anchor plate 191 then is inserted through the aperture 209 of the slider 20 to engages the nut 205.

As shown in FIG. 2, a space is formed between the anchor plate 19 and the slider 20 by the spring 192. The plurality of holes 201 and 202 in the slider 20 are formed at positions which have the same distances from the anchor bolt 191, and the distance defined between the anchor bolt 191 and each of the plurality of holes 201 and 202 is substantially the same as the distance defined between the anchor bolt 191 and the hemispherical projection 193 of the spring 192. Accordingly, the hemispherical projection 193 of the spring 192 can be inserted selectively into the holes 201 and 202 to prevent the anchor plate 19 from rotating about the anchor bolt 191. The bias force of the spring 192 then ensures that the hemispherical projection 193 stays in a particular hole 201 or 202 once placed there.

Figure 6:
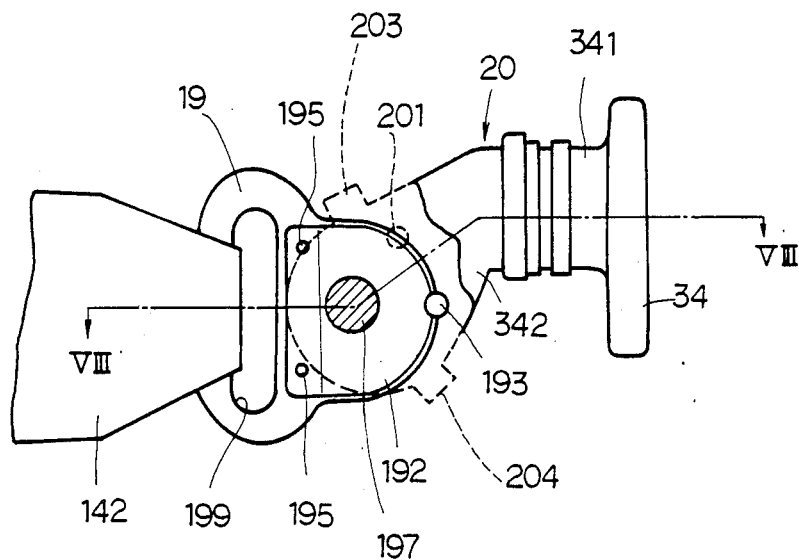
FIG. 6 is an enlarged side view showing the adjusting means, wherein the anchor plate is located in a first position and a part of the slider is indicated by a phantom line.

FIG. 6 shows the anchor plate 19 located at a first position in relation to the slider 20, wherein the leg portion 342 of the slider 20 is indicated by the phantom line to show the relationship between the anchor plate 19 and the slider 20. The hemispherical projection 193 of the spring 192 is inserted into the hole 202 and an edge of the anchor plate 19 is in contact with the block 203. Accordingly, the anchor plate 19 is prevented from rotating in the clockwise direction in FIG. 6 by the block 203 and temporarily prevented from rotating in the counterclockwise direction by the hole 202 and the hemispherical projection 193.

Figure 7:
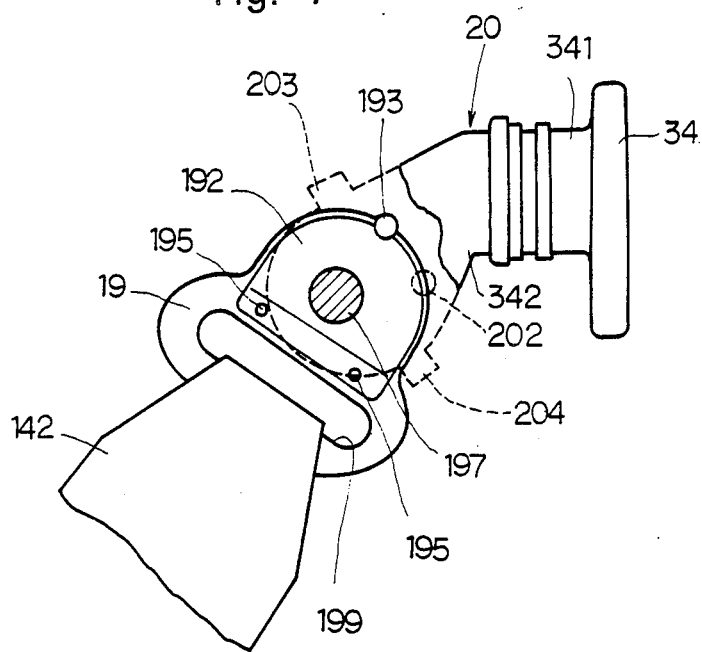
FIG. 7 is an enlarged side view showing the adjusting means, wherein the anchor plate is located in a second position and a part of the slider is indicated by a phantom line.

FIG. 7 shows the anchor plate 19 is located at a second postion in relation to the slider 20, wherein the leg portion 342 of the slider 20 again is indicated by the phantom line to show the relationship between the anchor plate 19 and the slider 20. The hemispherical projection 193 of the spring 192 now is inserted into the other hole 201 and the other edge of the anchor plate 19 is in contact with the other block 204. Accordingly, the anchor plate 19 is prevented from rotating in the counterclockwise direction in FIG. 7 by the other block 204 and temporarily prevented from rotating in the clockwise direction by the other hole 201 and the hemispherical projection 193.

Adjustment of the adjusting means is accomplished easily because when the anchor plate 19 is pushed toward the leg portion 342 of the slider 20, the hemispherical projection 193 of the spring 192 is moved out from the hole 202. As a result, the hemispherical projection 193 of the spring 192 then does not prevent the anchor plate 19 from rotating about the anchor bolt 191 and the occupant can select the most suitable position to fit the restraining webbing 14 to his particular size.

Figure 8:
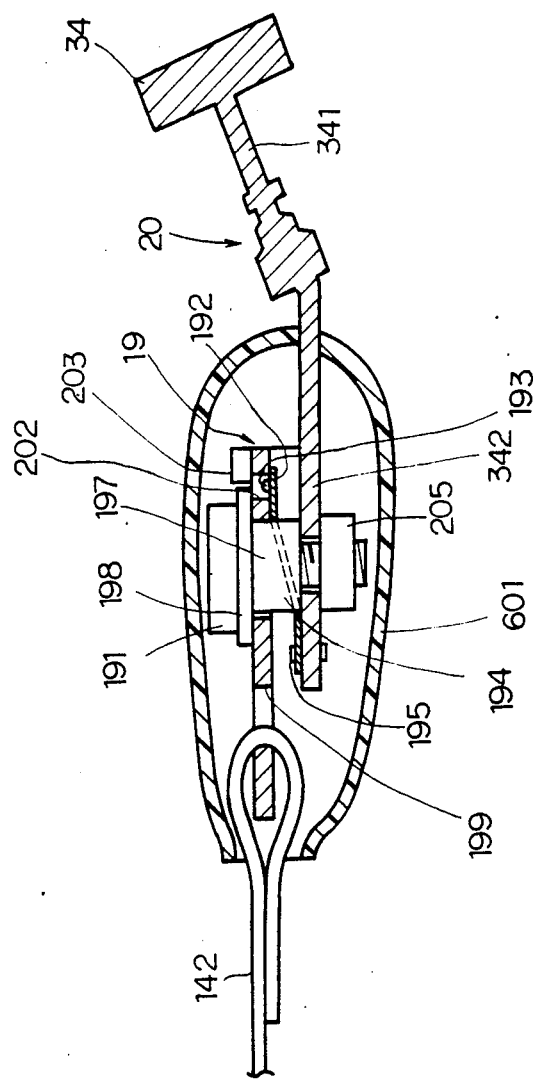
FIG. 8 is an enlarged sectional view taken along the line VIII—VIII in FIG. 6, wherein the adjusting means is concealed by a flexible cover and the adjusting holes are formed in the anchor plate rather than the slider.
Figure 14:
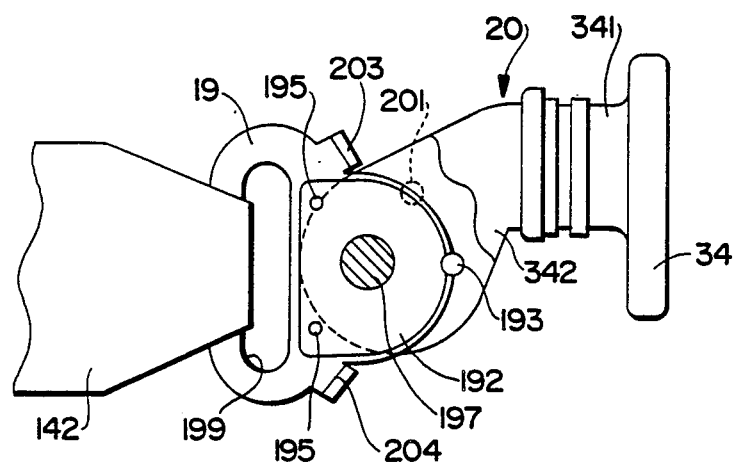
FIG. 14 is an enlarged side view showing the adjusting means with an alternative embodiment of the rotation preventing means.

As will be apparent to those skilled in the art, more than two holes 201, 202 can be provided in the leg portion 342 of the slider 20 to provide for greater adjustability. Additionally, it will be apparent that the holes 201, 202 could be provided in the anchor plate 19 rather than the slider 20, as shown in FIG. 8. The spring 192 then would be attached to the slider 20 rather than the plate 19 and positioned so that the hemispherical projection 193 can engage the newly positioned holes 201, 202. Similarly, the blocks 203, 204 could be attached to the anchor plate 19 rather than the slider 20 As shown in FIG. 14. As also shown in FIG. 8, the adjusting means may be concealed by a flexible cover 601 to improve the aesthetic appearance thereof.

Figure 9:
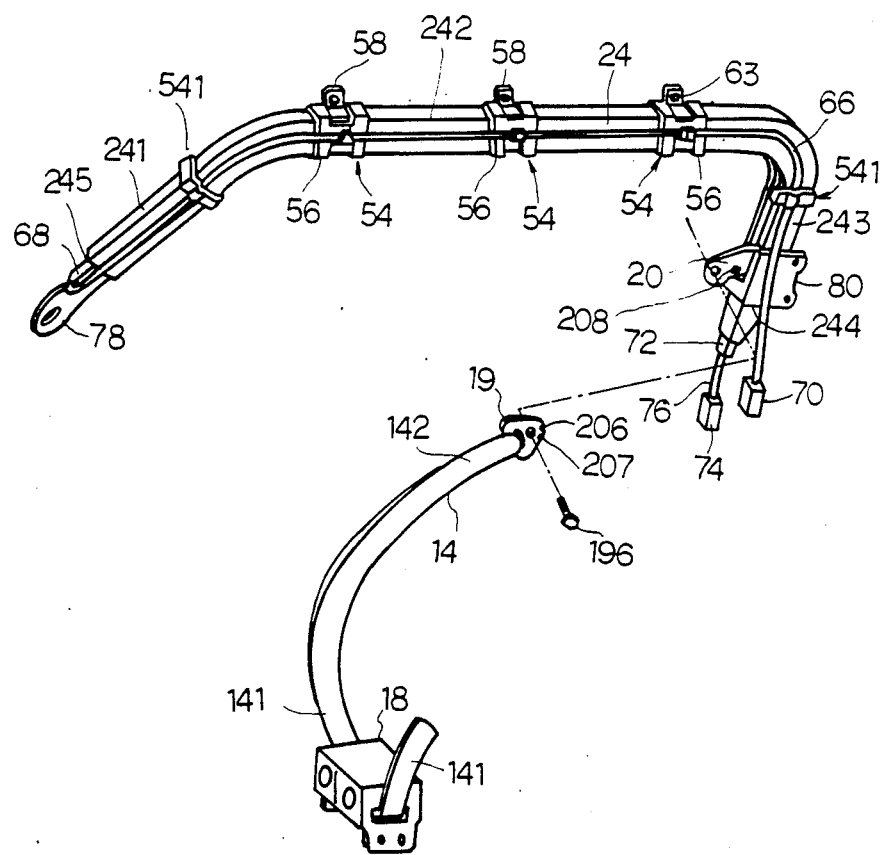
FIG. 9 is an enlarged perspective view of a guide rail of a second embodiment according to the present invention.
Figure 10:
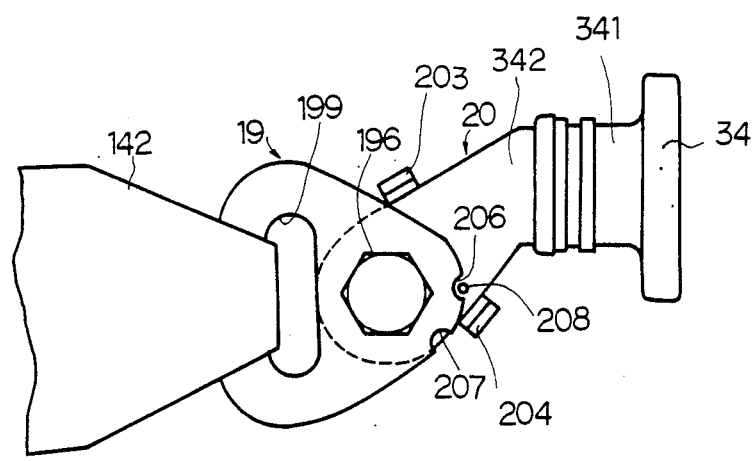
FIG. 10 is an enlarged side view showing the adjusting means of the second embodiment, wherein the anchor plate is located in a first position.
Figure 11:
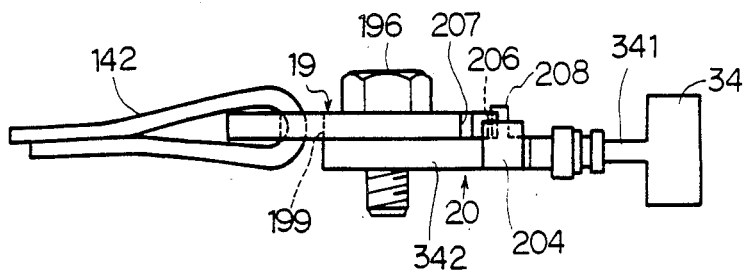
FIG. 11 is an enlarged bottom view showing the adjusting means of the second embodiment.

FIGS. 9 through 11 disclose a second embodiment of the present invention, wherein the anchor plate 19 and the slider 20 are modified. Elements of the second embodiment substantially identical to those of the first embodiment are shown with the same reference numerals and the description thereof for the first embodiment applies equally for the second embodiment.

In the second embodiment, the anchor plate 19 (rather than the slider 20) includes a plurality of recesses 206 and 207 and the slider 20 (rather than the spring 192) includes an engaging pin 208.

When the engaging pin 208 is engaged with the recess 206, the anchor plate 19 is prevented from rotating in the clockwise direction of FIG. 10 by the block 203 and prevented from rotating in the counterclockwise direction by the engaging pin 208. In the same manner, when the engaging pin 208 is engaged with the another recess 207, the anchor plate 19 is prevented from rotating in the counterclockwise direction of FIG. 10 by the other block 204 and prevented from rotating in the clockwise direction by the engaging pin 208.

To adjust the adjusting means of the second embodiment, an anchor bolt 196 holding the anchor plate 19 to the slider 20 is loosened sufficiently (i.e., by at least the height of the pin 208) to allow the anchor plate 19 to be moved in the axial direction of the anchor bolt 196 away from the slider 20 to disengage the engaging pin 208. The anchor plate 19 then can be rotated about the anchor bolt 196. The anchor plate 19 is moved towards the slider 20 in the axial direction of the anchor bolt 196 when the engaging pin 208 will engage with another of the recesses 206 and 207 and the anchor bolt 196 again tightened to secure the anchor plate 19 in the new position in relation to the slider 20 about the anchor bolt 196.

Figure 12:
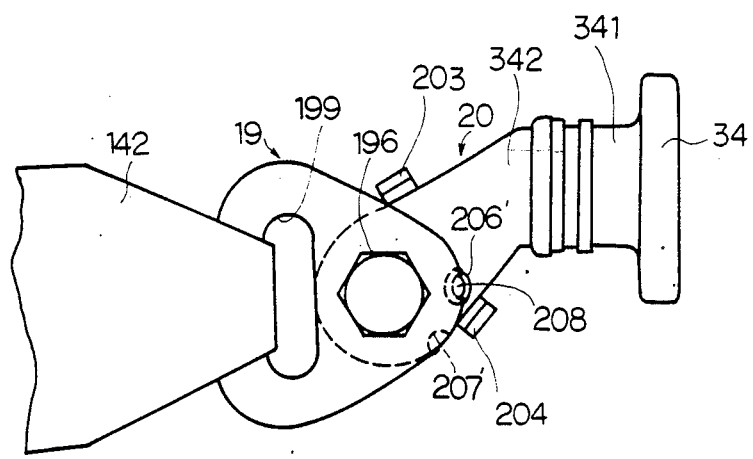
FIG. 12 and 13 depict an alternative version of the second embodiment, with FIG. 12 corresponding to FIG. 10 and FIG. 13 to FIG. 11.
Figure 13:
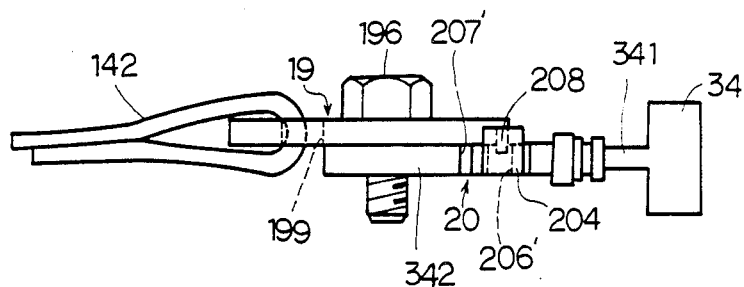

As will be apparent to one of ordinary skill in the art, the second embodiment of the present invention alternatively could have a hole 206' and a recess 207' formed in the slider 20, as shown in FIGS. 12 and 13, instead of recesses 206, 207 formed in the anchor plate 19. The pin 208 then is mounted on the anchor plate 19 rather than the slider 20.

As described herein, the present invention overcomes the shortcomings of the known art by providing an adjusting means for adjusting the position of an anchor plate in relation to a slider about an anchor bolt, while also preventing excessive rotation of the anchor plate.

While the present invention has been described in its preferred embodiments, it is to be understood that the invention is not limited thereto, and may be otherwise embodied within the scope of the following claims.

What is claimed is:

1. A seatbelt assembly for automatically fastening a restraining webbing around an occupant in a vehicle, comprising:
   a guide rail having a longitudinal guide groove formed therein;
   a slider displaceable along said longitudinal guide groove;
   an anchor plate pivotally mounted to said slider, the restraining webbing being attached to said anchor plate;
   adjusting means for adjusting a normal position of said anchor plate in relation to said slider, thereby permitting adjustment of the position of the restraining webbing relative to the size of the occupant; and
   rotation preventing means for preventing said anchor plate from rotating beyond a predetermined angle relative to said slider.

2. The seatbelt assembly of claim 1, wherein said adjusting means comprises:
   a plurality of engaging devices formed in a first one of said slider and said anchor plate; and
   bias means secured to a second one of said slider and said anchor plate, said bias means including an engagement member for selectively engaging one of the plurality of engaging devices to prevent said anchor plate from pivoting relative to said slider.

3. The seatbelt assembly of claim 2, wherein the plurality of engaging devices comprises a plurality of holes formed in said first one of said slider and said anchor plate.

4. The seatbelt assembly of claim 3, wherein the engagement member of said bias means comprises a hemispherical projection on said bias means, said projection projecting towards and engageable with each said hole.

5. The seatbelt assembly of claim 2, further comprising bolt means for pivotally mounting said anchor plate to said slider.

6. The seatbelt assembly of claim 5, wherein said bias means is disposed between said anchor plate and said slider and biases said anchor plate away from said slider.

7. The seatbelt assembly of claim 6, wherein said bias means includes an aperture formed therein and said bolt means extends through said aperture to locate said bias means securely between said anchor plate and said slider.

8. The seatbelt assembly of claim 5, wherein said bolt means extends through said anchor plate and comprises an engaging portion engaging said slider and a head portion disposed on a side of said anchor plate opposite from said slider, said anchor plate being pivotal about said bolt means between said slider and said head portion when said engagement member is disengaged from the plurality of engaging devices.

9. The seatbelt assembly of claim 8, wherein said head portion is spaced apart from said slider by more than a thickness of said anchor plate and said bias means is disposed between said anchor plate and said slider to bias said anchor plate away from said slider and against said head portion.

10. The seatbelt assembly of claim 1, wherein said adjusting means comprises:
   an adjusting bolt engaged with said slider, said anchor plate being mounted pivotally to said slider by said adjusting bolt;
   a plurality of engaging devices formed on a first one of said slider and said anchor; and an engagement member mounted to a second one of said slider and said anchor plate, said engagement member selectively engaging one of said plurality of engaging devices to prevent said anchor plate from pivoting about said slider on said adjusting bolt.

11. The seatbelt assembly of claim 10, wherein said slider includes a threaded aperture formed therein and said adjusting bolt comprises a threaded engaging portion for engaging said threaded aperture, a pivot portion about which said anchor plate pivots and a head portion broader than said pivot portion for holding said anchor plate on said pivot portion to secure said anchor plate between the head portion of said adjusting bolt and said slider, said adjusting bolt being at least partially disengageable from said slider such that when the adjusting bolt is engaged, said anchor plate is prevented from pivoting about said adjusting bolt by engagement of said engagement member with one of said engaging devices, but when the adjusting bolt is sufficiently partially disengaged, said anchor plate can pivot about said adjusting bolt.

12. The seatbelt assembly of claim 11, wherein said rotation preventing means comprises at least one block member located on at least one of said anchor plate and said slider.

13. The seatbelt assembly of claim 12, wherein said at least one block member is located on an outer peripheral portion of said slider such that it engages with an outer peripheral portion of said anchor plate, thereby preventing the anchor plate from pivoting about said adjusting bolt by more than said predetermined angle relative to said slider.

14. The seatbelt assembly of claim 13, wherein said at least one block member comprises a pair of block members, said pair of block members being oppositely located on outer peripheral portions of said slider.

15. The seatbeat assembly of claim 12, wherein said at least one block member is located on an outer peripheral portion of said anchor plate such that it engages with an outer peripheral portion of said slider, thereby preventing the anchor plate from pivoting about said adjusting bolt by more than said predetermined angle relative to said slider.

16. The seatbelt assembly of claim 15, wherein said at least one block member comprises a pair of block members, said pair of block members being oppositely located on outer peripheral portions of said anchor plate.

17. A seatbelt assembly for automatically fastening a restraining webbing around an occupant in a vehicle having a vehicle body member, comprising:
a guide rail having a longitudinal groove therein, said guide rail being mounted on the vehicle body member;
a slider displaceable along said longitudinal groove, said slider having a plurality of engaging holes formed therein;
an anchor plate pivotally mounted to said slider, the restraining webbing being secured to said anchor plate;
bias means secured to said anchor plate, said bias means including an engagement member for selectively engaging one of the plurality of engaging holes such that when the engagement member of said bias means engages with one of the plurality of engaging holes of said slider, said anchor plate is prevented from pivoting relative to said slider; and
rotation preventing means for preventing said anchor plate from rotating beyond a predetermined angle relative to said slider.

18. The seatbelt assembly of claim 17, further comprising pivot means for pivotally mounting said anchor plate to said slider.

19. The seatbelt assembly of claim 18, wherein said bias means is disposed between said anchor plate and said slider and biases said anchor plate away from said slider.

20. The seatbelt assembly of claim 17, wherein said rotation preventing means comprises at least one block member located on at least one of said anchor plate and said slider.

21. The seatbelt assembly of claim 20, wherein said at least one block member is located on an outer peripheral portion of said slider such that it engages with an outer peripheral portion of said anchor plate, thereby preventing the anchor plate from pivoting about said adjusting bolt by more than said predetermined angle relative to said slider.

22. The seatbelt assembly of claim 21, wherein said at least one block member comprises a pair of block members, said pair of block members being oppositely located on outer peripheral portions of said slider.

23. The seatbelt assembly of claim 20, wherein said at least one block member is located on an outer peripheral portion of said anchor plate such that it engages with an outer peripheral portion of said slider, thereby preventing the anchor plate from pivoting about said adjusting bolt by more than said predetermined angle relative to said slider.

24. The seatbelt assembly of claim 23, wherein said at least one block member comprises a pair of block members, said pair of block members being oppositely located on outer peripheral portions of said anchor plate.

25. A seatbelt assembly for automatically fastening a restraining webbing around an occupant in a vehicle having a vehicle body member, comprising:
a guide rail having a longitudinal groove formed therein, said guide rail being mounted on the vehicle body member;
a slider displaceable along said longitudinal groove, said slider having an engaging projection formed thereon;
an adjusting bolt engaging with said slider;
an anchor plate pivotally mounted to said slider by said adjusting bolt, the restraining webbing secured to said anchor plate, and said anchor plate including a plurality of recesses formed therein, said engaging projection of said slider selectively engaging one of the plurality of recesses of said anchor plate to prevent said anchor plate from rotating about said adjusting bolt ; and
rotation preventing means for preventing said anchor plate from rotating beyond a predetermined angle relative to said slider.

26. The seatbelt assembly of claim 25, wherein said adjusting bolt comprises an engaging portion for adjustably engaging said slider and a head portion for holding said anchor plate near said slider, said anchor plate being disposed between said head portion and said slider, wherein said anchor plate is pivotal relative to said slider when said head portion is spaced apart from said slider by at least a predetermined distance substantially equal to the thickness of said anchor plate plus the height of said engaging projection, but is prevented from rotating by engagement of said engaging projection with one of said plurality of holes when said head portion is spaced from said slider by less than said predetermined distance, the distance said head portion is spaced from said slider being adjustable by adjusting a degree of engagement of said engaging portion with said slider.

27. The seatbelt assembly of claim 25, wherein said rotation preventing means comprises at least one block member located on at least one of said anchor plate and said slider.

28. The seatbelt assembly of claim 27, wherein said at least one block member is located on an outer peripheral portion of said slider such that it engages with an outer peripheral portion of said anchor plate, thereby preventing the anchor plate from pivoting about said adjusting bolt by more than said predetermined angle relative to said slider.

29. The seatbelt assembly of claim 28, wherein said at least one block member comprises a pair of block members, said pair of block members being oppositely located on outer peripheral portions of said slider.

30. The seatbelt assembly of claim 27, wherein said at least one block member is located on an outer peripheral portion of said anchor plate such that it engages with an outer peripheral portion of said slider, thereby preventing the anchor plate from pivoting about said adjusting bolt by more than said predetermined angle relative to said slider.

31. The seatbelt assembly of claim 30, wherein said at least one block member comprises a pair of block members, said pair of block members being oppositely located on outer peripheral portions of said anchor plate.

* * * * *